US012590659B2

(12) United States Patent
Sumiyoshi et al.

(10) Patent No.: US 12,590,659 B2
(45) Date of Patent: Mar. 31, 2026

(54) HOSE JOINT SLEEVE AND HOSE JOINT WITH THE SAME

(71) Applicant: TOYOX CO., LTD., Toyama (JP)

(72) Inventors: Yoichi Sumiyoshi, Toyama (JP);
Tomoaki Tanaka, Toyama (JP)

(73) Assignee: TOYOX CO., LTD., Toyama (JP)

( * ) Notice: Subject to any disclaimer, the term of this patent is extended or adjusted under 35 U.S.C. 154(b) by 95 days.

(21) Appl. No.: 17/635,194

(22) PCT Filed: Apr. 30, 2020

(86) PCT No.: PCT/JP2020/018257
§ 371 (c)(1),
(2) Date: Feb. 14, 2022

(87) PCT Pub. No.: WO2021/220457
PCT Pub. Date: Nov. 4, 2021

(65) Prior Publication Data
US 2022/0290785 A1    Sep. 15, 2022

(51) Int. Cl.
F16L 33/23        (2006.01)
F16L 33/207       (2006.01)

(52) U.S. Cl.
CPC ........... F16L 33/23 (2013.01); F16L 33/2076 (2013.01)

(58) Field of Classification Search
CPC ....... F16L 21/005; F16L 21/06; F16L 19/083; F16L 33/2076; F16L 33/224; F16L 33/23
See application file for complete search history.

(56) References Cited

U.S. PATENT DOCUMENTS

| | | | | |
|---|---|---|---|---|
| 5,140,738 A | * | 8/1992 | Pinkerman, Jr. | ...... F16L 33/225 |
| | | | | 29/451 |
| 5,188,401 A | | 2/1993 | Staniforth | |
| 5,267,758 A | | 12/1993 | Shah et al. | |
| 7,455,328 B2 | * | 11/2008 | Chelchowski | ........ F16L 19/086 |
| | | | | 285/354 |
| 8,047,577 B2 | | 11/2011 | Zeiber | |

(Continued)

FOREIGN PATENT DOCUMENTS

| | | |
|---|---|---|
| CN | 101542180 | 9/2009 |
| CN | 102597593 | 7/2012 |

(Continued)

OTHER PUBLICATIONS

International Search Report in International Patent Application No. PCT/JP2020/018257, dated Jun. 30, 2020, (with English translation).

(Continued)

*Primary Examiner* — James M Hewitt, II
(74) *Attorney, Agent, or Firm* — Greenblum & Bernstein, P.L.C.

(57) ABSTRACT

A hose joint sleeve includes a sleeve main body that is deformable in a radial direction and is provided to hold a flexible hose between the sleeve main body and a nipple of a hose joint. The hose joint sleeve is configured to press and tighten the flexible hose toward an outer peripheral surface of the nipple with radial contraction and deformation of the sleeve main body, so as to fasten the flexible hose to the nipple so as to prevent the flexible hose from slipping off by coupling a plurality of belt-like bodies divided in the same shape.

4 Claims, 8 Drawing Sheets

(56) References Cited

U.S. PATENT DOCUMENTS

| | | | |
|---|---|---|---|
| 8,505,985 | B2 | 8/2013 | Nijsen et al. |
| 2003/0006610 | A1* | 1/2003 | Werth ..................... B25B 27/10 |
| | | | 285/322 |
| 2010/0102551 | A1 | 4/2010 | Zeiber |
| 2010/0156095 | A1 | 6/2010 | Inoue |
| 2012/0042503 | A1 | 2/2012 | Zeiber |
| 2012/0061956 | A1 | 3/2012 | Nijsen et al. |
| 2016/0061361 | A1 | 3/2016 | Fujii |

FOREIGN PATENT DOCUMENTS

| | | |
|---|---|---|
| CN | 103917816 | 7/2014 |
| CN | 104302960 | 1/2015 |
| CN | 105209810 | 12/2015 |
| CN | 106170655 | 11/2016 |
| DE | 27 48 429 | 5/1978 |
| JP | 10-132174 | 5/1998 |
| JP | 11-248075 | 9/1999 |
| JP | 2001-32984 | 2/2001 |
| JP | 2013-40645 | 2/2013 |
| JP | 2014-109296 | 6/2014 |
| JP | 2015-48888 | 3/2015 |
| WO | 90/07671 | 7/1990 |
| WO | 99/31425 | 6/1999 |
| WO | 2010/114366 | 10/2010 |
| WO | 2013/058358 | 4/2013 |

OTHER PUBLICATIONS

International Preliminary Report on Patentability in International Patent Application No. PCT/JP2020/018257, dated Jan. 12, 2021, (with English translation).

Written Opinion of the International Searching Authority in International Patent Application No. PCT/JP2020/018257, dated Jun. 30, 2020, (with English translation).

Office Action, in counterpart Chinese Patent Application No. 202080052986.0, issued on May 19, 2023, with English translation.

Extended European Search Report, European Patent Office, in counterpart EP Patent Application No. 20932846.7, issued on Jul. 20, 2022 (in English).

Office Action issued in the counterpart Indonesian patent application No. P00202203195 on Sep. 18, 2023, and English translation thereof.

Office Action issued in the counterpart Chinese patent application No. 202080052986.0 on Feb. 18, 2024, and English translation thereof.

Office Action issued in the counterpart Chinese patent application No. 202080052986.0 on May 28, 2024, and English translation thereof.

Office Action issued in the counterpart Chinese patent application No. 202080052986.0 on Sep. 11, 2024 (and English translation thereof).

Office Action issued in the corresponding Indian patent application No. 202217018815, dated Nov. 3, 2025, along with English translation.

* cited by examiner

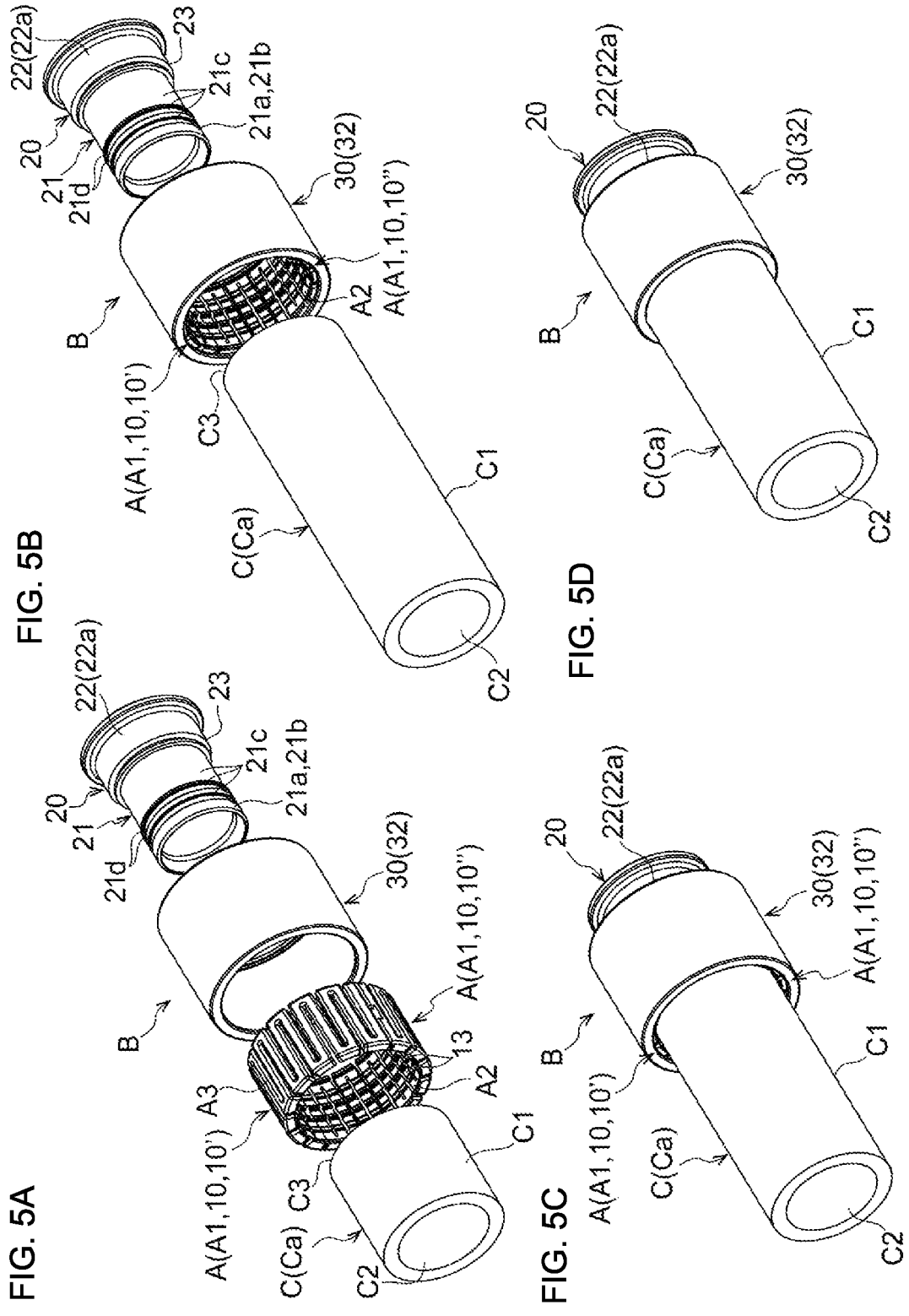

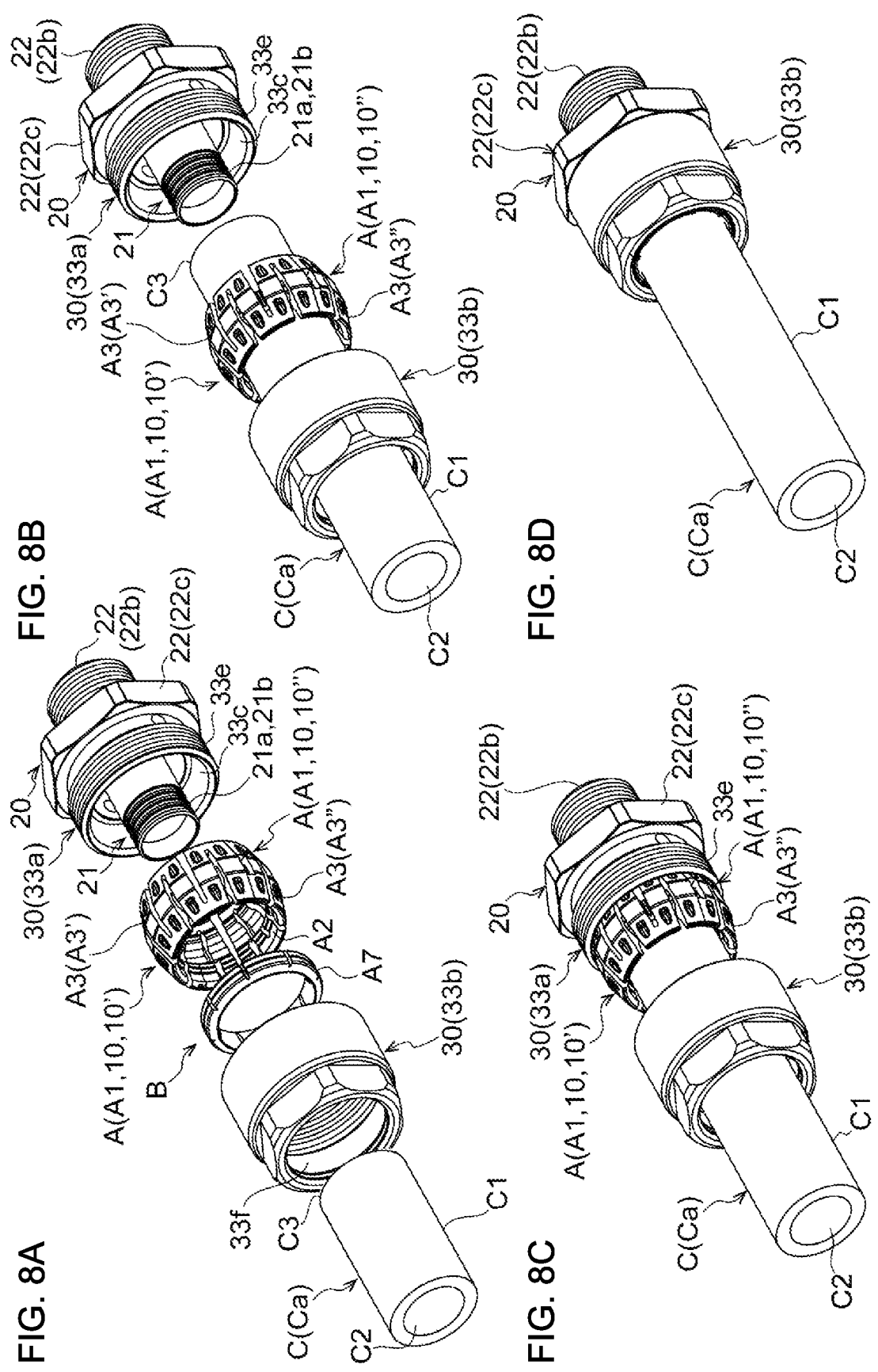

HOSE JOINT SLEEVE AND HOSE JOINT WITH THE SAME

TECHNICAL FIELD

The present invention relates to a hose joint sleeve and a hose joint with the same used in a hose joint for piping and connecting a flexible hose including a hose or a tube and the like formed of a soft material such as silicone rubber.

BACKGROUND ART

As the hose joint of this type, there has been a flexible hose connection joint that inserts and holds a connection hose made of a flexible hose such as a polyethylene hose between a hose insertion core tube formed at one end of a main body (a body part) and a tightening ring and presses and tightens the connection hose toward the outer peripheral surface of the hose insertion core tube with radial contraction and deformation of the tightening ring (see, for example, PTL1).

The tightening ring is made of a moderately elastic material such as polyacetal resin. Cutting of slits for radial contraction is alternately made from both sides. The slits are brought close in a circumferential direction and narrowed by narrowing by box nuts, whereby the tightening ring is radially contracted and deformed as a whole.

An uneven portion is formed on the inner wall surface of the tightening ring. The uneven portion is bit into the outer surface of the connection hose by the radial contraction of the tightening ring to tighten the connection hose to the hose insertion core tube.

CITATION LIST

Patent Literature

[PTL 1] Japanese Patent Application Laid-Open No. H11-248075

SUMMARY OF INVENTION

Technical Problem

Incidentally, as a constituent material of a soft hose (a flexible hose) to be the connection hose, silicon rubber having excellent characteristics such as heat resistance and cold resistance, low dissolution, high insulation, and tasteless and odorless attracts attention. In particular, the silicone rubber is demanded in, in particular, the food and drink industry, the semiconductor industry, the chemical industry, and the like.

To surely retain and connect the soft hose (the flexible hose) made of silicone rubber to the hose insertion core tube (a nipple), as described in PTL1, the uneven portion on the inner wall surface (the inner surface) of the tightening ring made of the resin material harder than the material of the soft hose (the flexible hose) needs to be bit into the outer surface of the soft hose (the flexible hose) and tightened.

However, when resin molding of the tightening ring is performed by injection molding or the like, since the uneven portion formed on the inner wall surface (the inner surface) of the tightening ring is undercut, it is difficult to take out (release) a molded product from a die. There is a problem in that the tightening ring having a complicated shape cannot be produced in a large quantity.

Under such circumstances, there has been a demand for a tightening ring made of a resin molded product that is surely capable of retaining and connecting even a flexible hose is made of a soft material such as silicone rubber to a hose insertion core tube (a nipple) and has a simple structure.

Solution to Problem

In order to solve such a problem, a hose joint sleeve according to the present invention is a hose joint sleeve including a sleeve main body that is deformable in a radial direction and is provided to hold a flexible hose between the sleeve main body and a nipple of a hose joint, the hose joint sleeve being configured to press and tighten the flexible hose toward an outer peripheral surface of the nipple with radial contraction and deformation of the sleeve main body, wherein the sleeve main body includes a plurality of belt-like (band-shaped) bodies divided at equal intervals in a circumferential direction of the sleeve main body, and each of the belt-like bodies being formed to be deformable in the circumferential direction, each of the plurality of belt-like bodies includes a fitting part provided at one end in a circumferential direction of each of the plurality of belt-like bodies, a part to be fitted provided at the other end of each of the plurality of belt-like bodies, and a recessed part provided on an inner surface facing an outer surface of the flexible hose in a radial direction, the fitting part and the part to be fitted are formed in shapes such that the fitting part and the part to be fitted engage with each other to couple the plurality of belt-like bodies, and recessed parts each being the recessed part are formed to be annularly connected to each other concomitantly with the coupling of the plurality of belt-like bodies.

BRIEF DESCRIPTION OF DRAWINGS

FIG. 1A being an enlarged longitudinal sectional front view before tightening of the hose joint sleeve and FIG. 1B being an enlarged longitudinal sectional front view after the tightening of the hose joint sleeve.

FIG. 2A illustrating a coupled state and FIG. 2B illustrating a disassembled state.

FIG. 3A being an exploded perspective view before connection, FIG. 3B being a perspective view of an assembly start state, FIG. 3C being a perspective view before tightening, and FIG. 3D being a perspective view after the tightening.

FIG. 4A being an enlarged longitudinal sectional front view before tightening of the hose joint sleeve and FIG. 4B being an enlarged longitudinal sectional front view after the tightening of the hose joint sleeve.

FIGS. 5A to 5D are reduced perspective views illustrating a connecting method for a hose joint and a flexible hose. FIG. 5A being an exploded perspective view before connection, FIG. 5B being an external perspective view of an assembly start state, FIG. 5C being an external perspective view before tightening, and FIG. 5D being an external perspective view after the tightening.

Figures 6A, 6B:
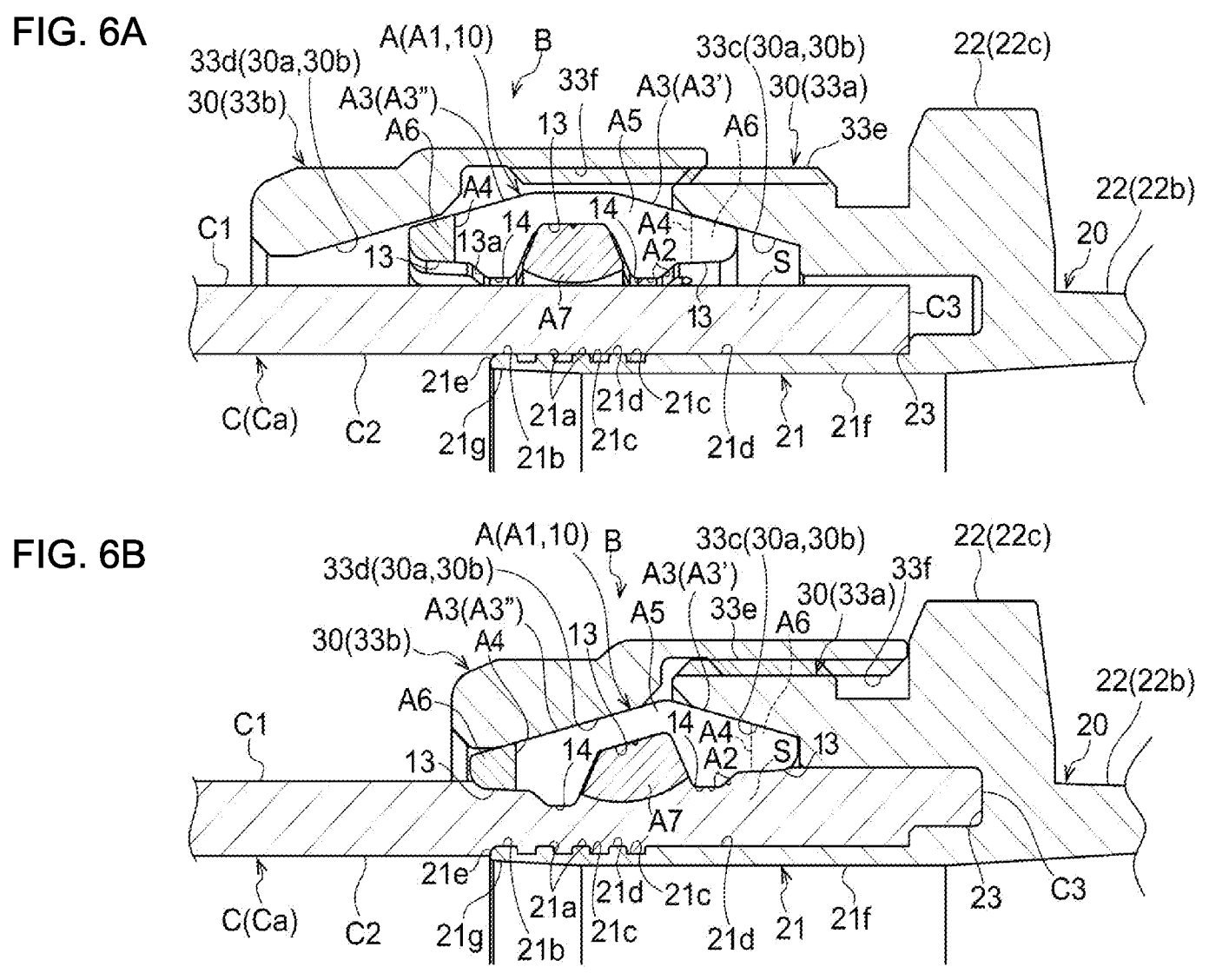

FIGS. 6A and 6B are explanatory diagrams illustrating an overall configuration of a hose joint in which a hose joint sleeve according to a third embodiment of the present invention is incorporated. FIG. 6A being an enlarged longitudinal sectional front view before tightening of the hose joint sleeve and FIG. 6B being an enlarged longitudinal sectional front view after the tightening of the hose joint sleeve.

Figure 7A:
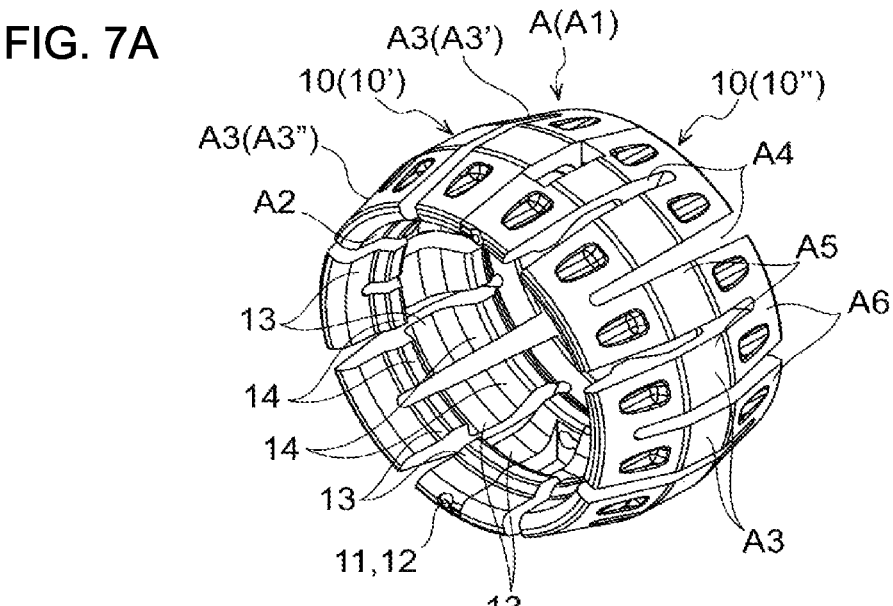
Figure 7B:
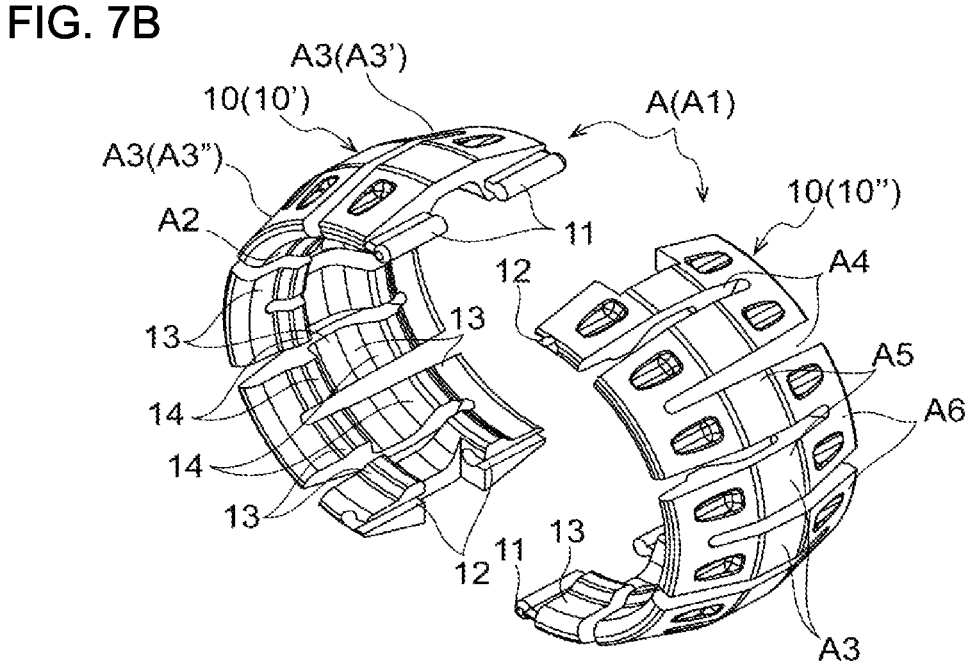

FIGS. 7A and 7B are enlarged perspective views of the hose joint sleeve. FIG. 7A illustrating a coupled state and FIG. 7B illustrating a disassembled state.

FIGS. 8A to 8D are reduced perspective views illustrating a connecting method for a hose joint and a flexible hose. FIG. 8A being an exploded perspective view before connection, FIG. 8B being an external perspective view of an assembly start state, FIG. 8C being an external perspective view before tightening, and FIG. 8D being an external perspective view after the tightening.

DESCRIPTION OF EMBODIMENTS

Embodiments of the present invention are explained in detail below with reference to the drawings.

As illustrated in FIGS. 1A to 8D, a hose joint sleeve A according to an embodiment of the present invention includes a cylindrical sleeve main body A1 and is used in a hose joint B in which, after a flexible hose C is inserted into a nipple 21 of a joint main body 20, the outer side of the flexible hose C is covered with the sleeve main body A1, and the flexible hose C is pressed and tightened toward an outer peripheral surface 21a of the nipple 21 by the sleeve main body A1.

The hose joint B in which the hose joint sleeve A is incorporated includes, as main components, a nipple 21 of a joint main body 20 provided along an insertion space S for the flexible hose C, a sleeve main body A1 of the hose joint sleeve A provided to surround the outer periphery of the insertion space S for the flexible hose C, and a tightening member 30 provided on the outer side of the sleeve main body A1.

The sleeve main body A1 is pressed toward the nipple 21 by the tightening member 30, whereby the flexible hose C is held between the nipple 21 and the sleeve main body A1 and connected to be unable to be pulled out.

Figure 2A:
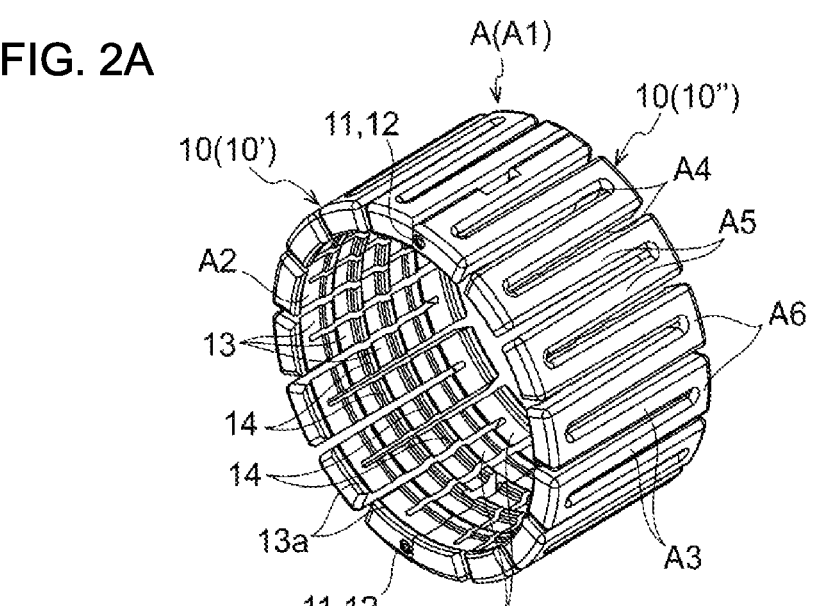
FIGS. 2A and 2B are enlarged perspective views of the hose joint sleeve.
Figure 2B:
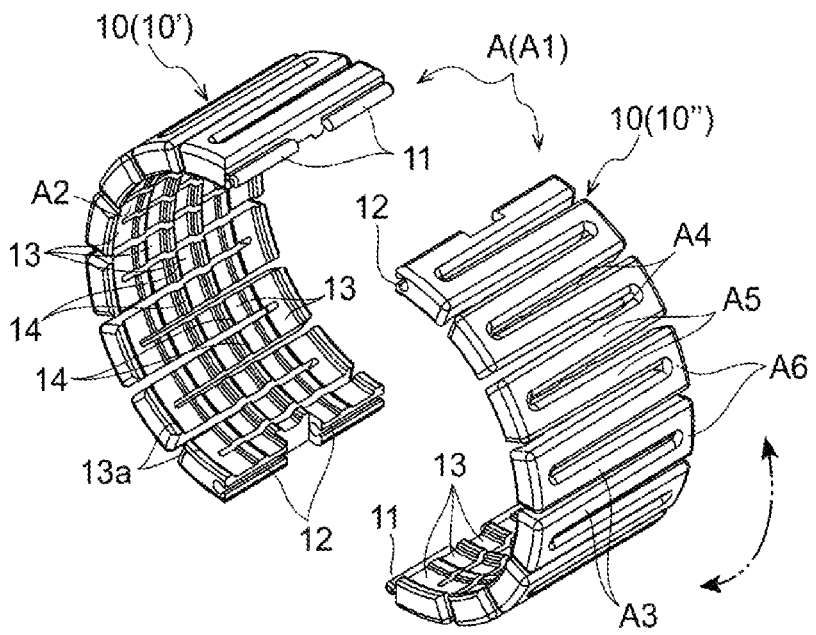

As illustrated in FIGS. 2A and 2B and the like, the sleeve main body A1 of the hose joint sleeve A is formed of an elastically deformable hard material excellent in heat resistance such as soft synthetic resin or rubber containing fluorocarbon resin such as polyvinylidene fluoride (PVDF) and harder than a constituent material of the flexible hose C explained below and is formed to be flexibly deformed at least in a circumferential direction and elastically deformed in a radial direction.

Figures 1A, 1B:
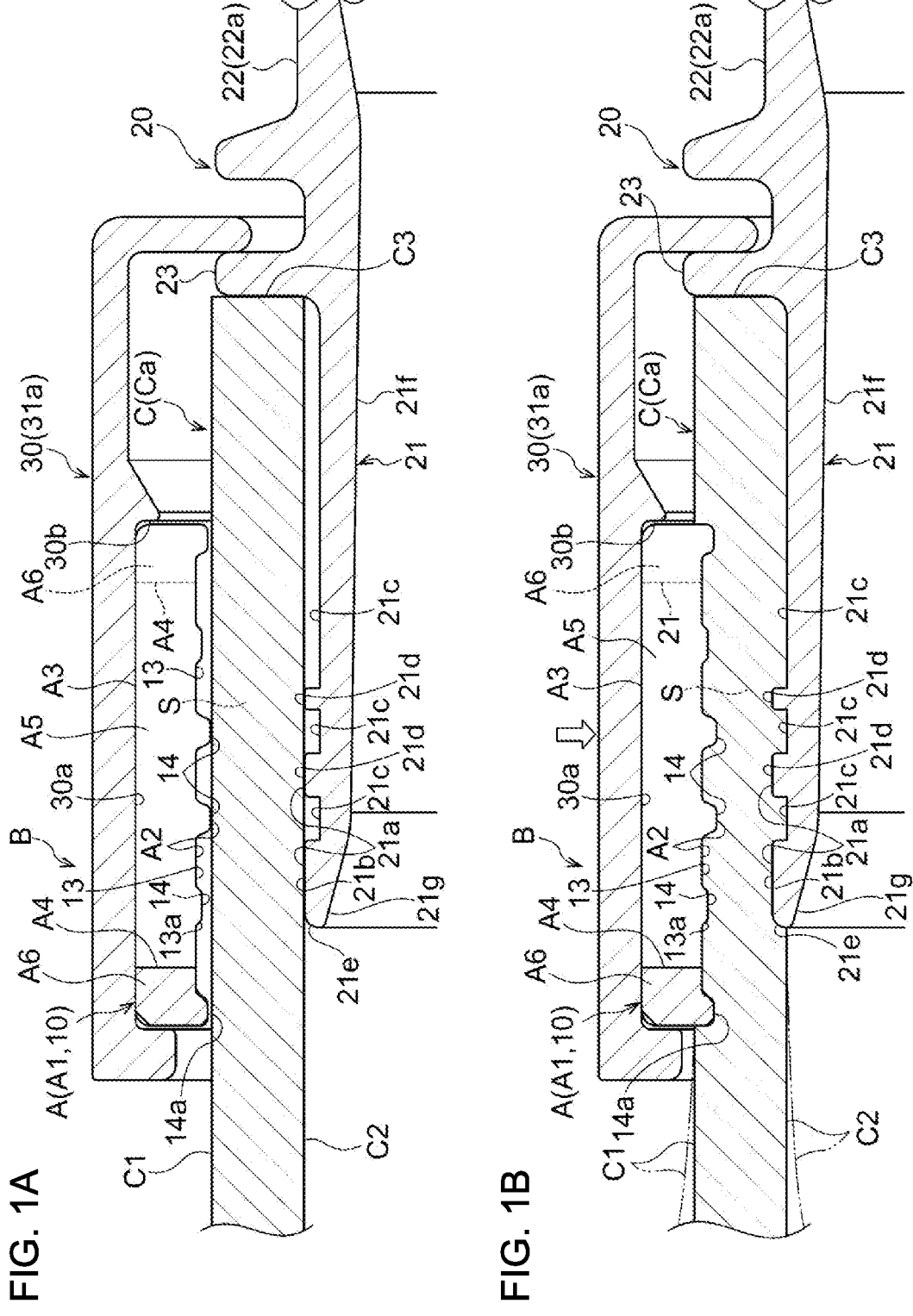
FIGS. 1A and 1B are explanatory diagrams illustrating an overall configuration of a hose joint in which a hose joint sleeve according to an embodiment (a first embodiment) of the present invention is incorporated.

As illustrated in FIGS. 1A and 1B and the like, the sleeve main body A1 is assembled to face, in the radial direction, the outer side of an outer peripheral surface 21a of the nipple 21 explained below across the insertion space S for the flexible hose C.

That is, in a set state illustrated in FIGS. 1A and 1B and the like in which the sleeve main body A1 is assembled to the flexible hose C inserted into the nipple 21, a sleeve inner surface A2, which is the inner peripheral surface of the sleeve main body A1, faces an outer surface C1 of the flexible hose C in the radial direction and a sleeve outer surface A3, which is the outer peripheral surface of the sleeve main body A1, faces the tightening member 30 explained below in the radial direction.

The sleeve main body A1 is elastically radially contracted and deformed and radially expanded and deformed according to pressing by the tightening member 30 explained below. The inner diameter of the sleeve main body A1 during the radial contraction is set to be smaller than the outer diameter of the flexible hose C. The inner diameter of the sleeve main body A1 during the radial expansion is set to be substantially the same as or slightly larger than the outer diameter of the flexible hose C.

The sleeve main body A1 preferably includes a plurality of cut-out and formed slits A4 and a plurality of belt plate parts A5 formed among the plurality of slits A4. Consequently, the sleeve main body A1 is smoothly elastically deformable in the radial direction.

The plurality of slits A4 are disposed at predetermined intervals in the circumferential direction of the sleeve main body A1 to respectively extend in an axial direction. The plurality of belt plate parts A5 formed among the slits A4 are disposed to be substantially parallel to one another.

The plurality of slits A4 and the plurality of belt plate parts A5 are configured such that the plurality of belt plate parts A5 are gradually brought close in the circumferential direction by pressing of the tightening member 30 explained below and, at the same time, each of the intervals among the plurality of slits A4 is narrowed in the circumferential direction, whereby the sleeve main body A1 is radially contracted and deformed as a whole. The plurality of slits A4 and the plurality of belt plate parts A5 are also configured such that pressing by the tightening member 30 is released to make the plurality of belt plate parts A5 to be gradually separated in the circumferential direction, and at the same time, each of the intervals among the plurality of slits A4 is broadened in the circumferential direction, whereby the sleeve main body A1 is radially expanded and deformed as a whole.

An entire shape of the sleeve main body A1 is preferably formed in a shape symmetrical in the axial direction. Consequently, the same function is obtained in either case where the sleeve main body A1 is arranged in a normal or reverse orientation in the axial direction with respect to the nipple 21 of the joint main body 20.

As a specific example of the sleeve main body A1, in a case illustrated in FIGS. 1A to FIG. 3D and the like, the sleeve main body A1 is formed in a zigzag shape in which, on both sides in the axial direction of the sleeve main body A1, the plurality of slits A4 linearly extending in the axial direction and dividing the sleeve main body A1 into the plurality of belt plate parts A5 and a plurality of connection parts A6 that join together the plurality of belt plates parts A5 together in the circumferential direction are alternately disposed in the circumferential direction.

As illustrated in FIGS. 2A and 2B and the like, a width dimension in the circumferential direction is reduced in the plurality of belt plate parts A5, whereby a large number of the slits A4 and a large number of the belt plate parts A5 are disposed in the circumferential direction.

As other examples, although not illustrated in the figures, it is also possible to dispose the plurality of slits A4, the plurality of belt plate parts A5, and the plurality of connection parts A6 in a shape other than the zigzag shape, cut and form the plurality of slits A4 to extend in a nonlinear shape such as a curve shape other than the linear shape, and change sizes and shapes of the plurality of slits A4, the plurality of belt plate parts A5, and the plurality of connection parts A6 to sizes and shapes other than those illustrated in the figures.

As illustrated in FIGS. 2A and 2B and the like, the sleeve main body A1 includes a plurality of belt-like bodies 10 divided at equal intervals in the circumferential direction of the sleeve main body A1.

The plurality of belt-like bodies 10 are divided components having the same shape including the plurality of slits A4, the plurality of belt plate parts A5, and the plurality of connection parts A6, each of the plurality of belt-like bodies 10 being formed deformable in the circumferential direction.

Further, the plurality of belt-like bodies 10 include a fitting part 11 provided at one end in the circumferential direction of each of the plurality of belt-like bodies 10, a part to be fitted 12 provided at the other end of each of the plurality of belt-like bodies 10, and a recessed part 13 provided on an inner surface (the sleeve inner surface A2) facing the outer surface C1 of the flexible hose C in the radial direction.

A pair of the fitting part 11 and the part to be fitted 12 is disposed at both ends in the circumferential direction of each belt-like body 10 and is formed in a shape with which the fitting part 11 and the part to be fitted 12 of another belt-like body 10 engage to be detachably coupled.

That is, the fitting part 11 of any one belt-like body 10 (a first belt-like body 10') of the plurality of belt-like bodies 10 is engaged with the part to be fitted 12 of another belt-like body 10 (a second belt-like body 10"), whereby the plurality of belt-like bodies 10 are cylindrically coupled and configured to be the sleeve main body A1 deformable in the circumferential direction.

The recessed part 13 is formed on the inner surface of each belt-like body 10, which is the sleeve inner surface A2. It is preferable to dispose a plurality of recessed parts 13 respectively at each predetermined interval in the width direction, which is the axial direction, of the sleeve main body A1. The recessed parts 13 are formed to be annularly connected to each other concomitantly with the coupling of the plurality of belt-like bodies 10 by the fitting parts 11 and the parts to be fitted 12. When the plurality of recessed parts 13 are formed on the inner surface of each belt-like body 10, a plurality of ribs 14 are unevenly formed to be adjacent to the plurality of recessed parts 13 in the width direction.

Further, the recessed parts 13 come into press contact with the outer surface C1 of the flexible hose C according to the radial contraction and deformation of the sleeve main body A1 and presses the flexible hose C toward the outer peripheral surface 21a of the nipple 21, whereby opening edges 13a of the recessed parts 13 (corners of the ribs 14) are configured to bite in the outer surface C1 of the flexible hose C.

It is preferable that the opening edges 13a of the recessed parts 13 (the corners of the ribs 14) are chamfered. Examples of the chamfering include R chamfering for machining the opening edges 13a in an arcuate shape in section and C chamfering for obliquely shaving off the opening edges 13a.

It is preferable to form, on the inner surfaces of the plurality of belt-like bodies 10, which form the sleeve inner surfaces A2, the plurality of recessed parts 13 at each predetermined interval in the width direction, which is the axial direction, of the sleeve main body A1.

As a specific example of the plurality of belt-like bodies 10, in the case illustrated in FIG. 1A to FIG. 3D and the like, the belt-like bodies 10 having the same shape formed by dividing the sleeve main body A1 into two in the circumferential direction are injection-molded. An engaging protrusion is formed as the fitting part 11 at one end in the circumferential direction of each belt-like body 10 and an engaging groove is formed at the other end in the circumferential direction of each belt-like body 10 as the part to be fitted 12 to unevenly engage the fitting part 11 and the part to be fitted 12 each other.

In the illustrated example, as indicated by arrows in FIG. 2B, the other (the second belt-like body 10") is slid in a state in which the other is changed (reversed) in a direction and aligned with one (the first belt-like body 10') of two belt-like bodies 10, whereby the fitting parts 11 and the parts to be fitted 12 (engaging protrusions and engaging grooves) are unevenly engaged and coupled. On the inner surface of the belt-like body 10, five recessed grooves are formed at each predetermined interval in the width direction as the plurality of recessed parts 13. Six ribs 14 are unevenly formed adjacent to the five recessed grooves in the width direction.

Note that, as other examples, although not illustrated in the figures, it is also possible to change the number of divisions of the sleeve main body A1 in the circumferential direction, change the shapes of the fitting parts 11 and the parts to be fitted 12 to shapes other than those in the illustrated example, and change disposition parts, the number of disposed pieces, the sizes, the shapes, and the like of the plurality of recessed parts 13 and the plurality of ribs 14 to disposition parts, the number of disposed pieces, sizes, shapes, and the like other than those in the illustrated example.

As illustrated in FIGS. 1A and 1B and the like, the joint main body 20 of the hose joint B is formed in a thick substantially cylindrical shape by metal such as stainless steel or brass less easily rusting or a rigid material such as hard synthetic resin or is formed by pressing or other molding.

The joint main body 20 includes a cylindrical nipple 21 and a connection part 22 for connection to other hose bodies (not illustrated) and hose connection ports (not illustrate) of other devices.

The nipple 21 is formed on a distal end side of the joint main body 20 to face, in the radial direction, an inner surface C2 of the flexible hose C explained below. The connection part 22 is formed on the proximal end side of the joint main body 20.

The nipple 21 is formed in a cylindrical shape having an outer diameter substantially the same as the inner diameter of the flexible hose C or slightly smaller than the inner diameter of the flexible hose C. The nipple 21 has an outer peripheral surface 21a that faces, in the radial direction, the inner surface C2 of the flexible hose C inserted into the insertion space S.

The outer peripheral surface 21a of the nipple 21 has, at the axial direction distal end, a large diameter cylindrical surface 21b that faces, in the radial direction, and is in press contact with the inner surface C2 of the flexible hose C.

The large diameter cylindrical surface 21b is formed in a non-inclined smooth shape having the same outer diameter over a region having a predetermined length in the axial direction on the outer peripheral surface 21a of the nipple 21.

Further, it is preferable that the outer peripheral surface 21a of the nipple 21 includes an annular groove 21c provided adjacent to the large diameter cylindrical surface 21b in the axial direction.

A plurality of annular grooves 21c are respectively formed at each predetermined interval toward the inner side (the proximal end side of the joint main body 20) on the outer peripheral surface 21a of the nipple 21.

Among the plurality of annular grooves 21c, a plurality of smooth large dimeter surfaces 21d are formed at substantially the same outer diameter as the outer diameter of the large diameter cylindrical surface 21*b*. The large diameter cylindrical surface 21*b*, the plurality of annular grooves 21*c*, and the plurality of large diameter surfaces 21*d* are unevenly formed to face the inner surface C2 of the flexible hose C in the radial direction and has a function of stopping slip-off of the flexible hose C.

It is preferable that a corner 21*e* of the large diameter cylindrical surface 21*b*, which is the distal end edge of the nipple 21, is chamfered. Examples of the chamfering include R chamfering for machining the corner 21*e* in an arcuate shape in section and C chamfering for obliquely shaving off the corner 21*e*.

It is preferable to form, on an inner peripheral surface 21*f* of the nipple 21, a tapered part 21*g* expanded in diameter toward the distal end of the nipple 21.

As a specific example of the joint main body 20, in the case illustrated in FIG. 1A to FIG. 3D and the like, the large diameter cylindrical surface 21*b*, the plurality of annular grooves 21*c*, and the plurality of large diameter surfaces 21*d* are alternately disposed in the axial direction at the distal end portion on the outer peripheral surface 21*a* of the nipple 21.

In the case of the illustrated example, two large diameter surfaces 21*d* are unevenly formed among three annular grooves 21*c*.

The corner 21*e* of the large diameter cylindrical surface 21*b*, which is the distal end edge of the nipple 21, is subjected to R chamfering as chamfering.

On the outer peripheral surface 21*a* of the nipple 21, slip-prevention means 23 for performing position restriction of the tightening member 30 explained below to be unable to move in the axial direction is provided. In the case of the illustrated example, a brim-like locking part is projected and formed as the slip-prevention means 23 for the tightening member 30 explained below is formed between the nipple 21 of the joint main body 20 and the connection part 22.

As other examples, although not illustrated in the figures, it is also possible to change disposition parts, the number of disposed pieces, and the sizes of the plurality of annular grooves 21*c* and the plurality of large diameter surfaces 21*d* to disposition parts, the number of disposed pieces, and sizes other than those illustrated in the figures and perform C chamfering of the corner 21*e* of the large diameter cylindrical surface 21*b*, which is the distal end edge of the nipple 21.

Further, as an example of the connection part 22, in a case illustrated in FIGS. 3A to 3D and the like, the connection part 22 is a ferrule 22*a*. The ferrule 22*a* is detachably connected to another ferrule (not illustrated) formed in a connection port of another device using a coupling instrument (not illustrated) called clamp or clamp band.

As another example of the connection part 22, in a case illustrated in FIGS. 8A to 8D, the connection part 22 is a screw 22*b*. The screw 22*b* is formed to be screwed with a screw (not illustrated) formed in a hose connection port of another device. The screws are screwed and detachably connected by rotational operation of a tool engaging part 22*c* engaged with a tool (not illustrated) such as a spanner or a wrench.

Note that, as another modification of the connection part 22, a connection part having structure other than the structure in the illustrated example can also be used instead of the ferrule 22*a* and the screw 22*b*.

As illustrated in FIGS. 3A to 3D and the like, the tightening member 30 is compression means for radially contracting and deforming the sleeve main body A1. The tightening member 30 is formed in a cylindrical shape or a shape similar to a cylinder having an inner diameter slightly larger than the outer diameter of the sleeve main body A1 by metal such as stainless steel or brass less easily rusting or a rigid material such as hard synthetic resin.

The tightening member 30 includes a pressing part 30*a* that faces, in the radial direction, the outer peripheral surface (the sleeve outer surface A3) of the sleeve main body A1. The tightening member 30 is configured such that the flexible hose C is radially contracted and deformed by pressing the sleeve outer surface A3 in the radial direction with the pressing part 30*a* according to artificial operation.

In the tightening member 30, a locking part 30*b* engaging with the sleeve main body A1 in the axial direction is provided in the inner circumference that faces the sleeve outer surface A3 in the radial direction. It is preferable that the sleeve main body A1 is positioned to be immovable in the axial direction by the locking part 30*b*.

Specific examples of the tightening member 30 include compression means of a divided type illustrated in FIGS. 1A to 3D, compression means of a caulking type illustrated in FIGS. 4A to 5D, and compression means of an axial direction force conversion type illustrated in FIGS. 6A to 8D.

Further, as an example of the tightening member 30, in the cases illustrated in FIGS. 1A to 3D and FIGS. 4A to 5D, according to positioning of the sleeve main body A1 by the locking part 30*b*, the large diameter cylindrical surface 21*b* and the plurality of annular grooves 21*c* of the nipple 21 are set to face the rib 14 of the sleeve inner surface A2 in the radial direction across the flexible hose C.

At the same time, in the nipple 21, the plurality of large diameter surfaces 21*d* are set to face the plurality of recessed parts 13 on the sleeve inner surface A2 in the radial direction across the flexible hose C.

Figures 4A, 4B:
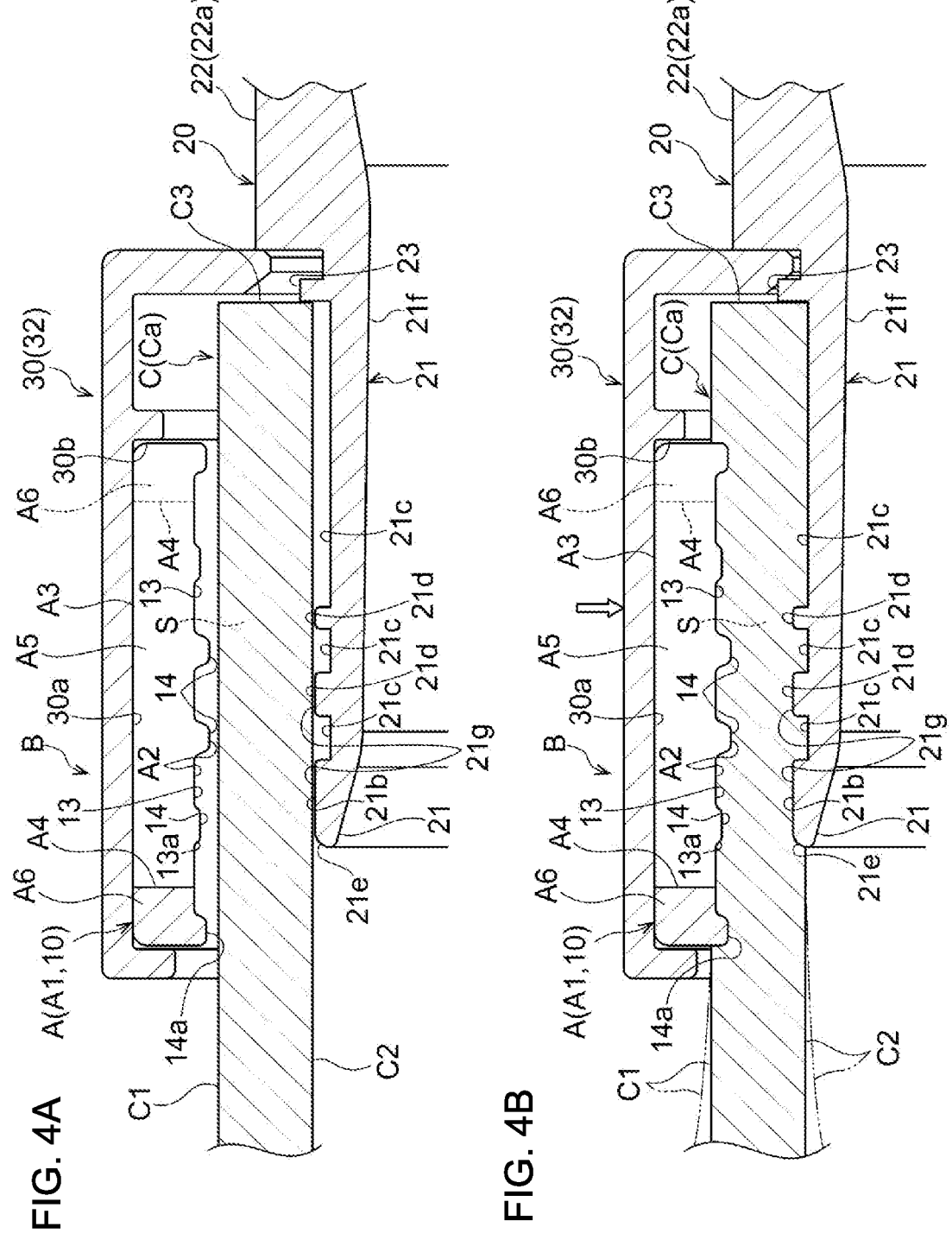
FIGS. 4A and 4B are explanatory diagrams illustrating an overall configuration of a hose joint in which a hose joint sleeve according to a second embodiment of the present invention is incorporated.

As illustrated in FIG. 1B and FIG. 4B, the rib 14 disposed at the end portion on the sleeve inner surface A2 is set to project to a position a predetermined length apart from the large diameter cylindrical surface 21*b* of the nipple 21 in the axial direction. The outer surface C1 of the flexible hose C is pressed to the radial direction inner side by the rib 14 disposed at the end portion, whereby the inner surface C2 of the flexible hose C pressed to the radial direction inner side is continuously connected to the tapered part 21*g* of the inner peripheral surface 21*f* of the nipple 21.

The flexible hose C is a hose body having flexibility such as a hose or a tube elastically deformably molded from a soft material such as silicone rubber or other rubber or soft synthetic resin such as vinyl chloride. It is preferable that the outer surface C1 and the inner surface C2 are flat in at least the connection end part Ca of the flexible hose C.

As illustrated in FIGS. 1A and 1B, the connection end part Ca having a predetermined length from a cut surface C3 of the flexible hose C is inserted into the insertion space S.

As a specific example of the flexible hose C, a hose of a single layer structure is used in the illustrated example.

As another example, although not illustrated in the figures, it is also possible to use, as the flexible hose C, a hose body of a plural layer structure or a multilayer structure including a plurality of layers instead of the hose body of the single layer structure. Specific examples of many kinds of the flexible hose C includes a laminated hose (a blade hose) in which a plurality of or a single synthetic resin blade (reinforcing yarn) is spirally embedded as an intermediate layer between an outer layer and an inner layer, which are transparent or opaque, a spiral reinforcing hose (VOHRAN hose) in which a belt-like reinforcing material having a rectangular shape in section made of synthetic resin or metal and a linear reinforcing material having a circular shape in section are wound in a spiral shape and integrated as an intermediate layer, and a spiral reinforce hose in which a metal wire material or a hard synthetic resin wire material is spirally embedded.

A hose joint B incorporating a hose joint sleeve A according to a first to third embodiments of the present invention is explained with reference to FIGS. 1A to 8D.

In the tightening member 30 of the hose joint B according to the first embodiment of the present invention, as illustrated in FIGS. 1A and 1B, FIGS. 2A and 2B, and FIGS. 3A to 3D, the sleeve main body A1 is radially contracted and deformed by the compression means of the divided type. In the compression means of the divided type, a plurality of divided holders 31a and 31b are moved to approach each other in the radial direction by a fastening component 31c such as a bolt, whereby the sleeve main body A1 is pressed in the radial direction and is radially contracted and deformed.

Specifically, the compression means of the divided type includes the plurality of divided holders 31a and 31b divided in the radial direction, and the fastening component 31c that moves the plurality of divided holders 31a and 31b to approach each other in the radial direction. By moving the plurality of divided holders 31a and 31b to approach each other with the fastening component 31c, the sleeve main body A1 is radially contracted and deformed.

In the case of the illustrated example, it is configured that the plurality of divided holders 31a and 31b are formed in a symmetrical shape by dividing a cylinder body into two in the radial direction, and the fastening component 31c formed by a screw component such as a bolt is inserted through peripheral end portions 31d of the divided holders 31a and 31b and rotated, whereby the divided holders 31a and 31b move to approach each other in the radial direction.

Figures 3A, 3B, 3C, 3D:
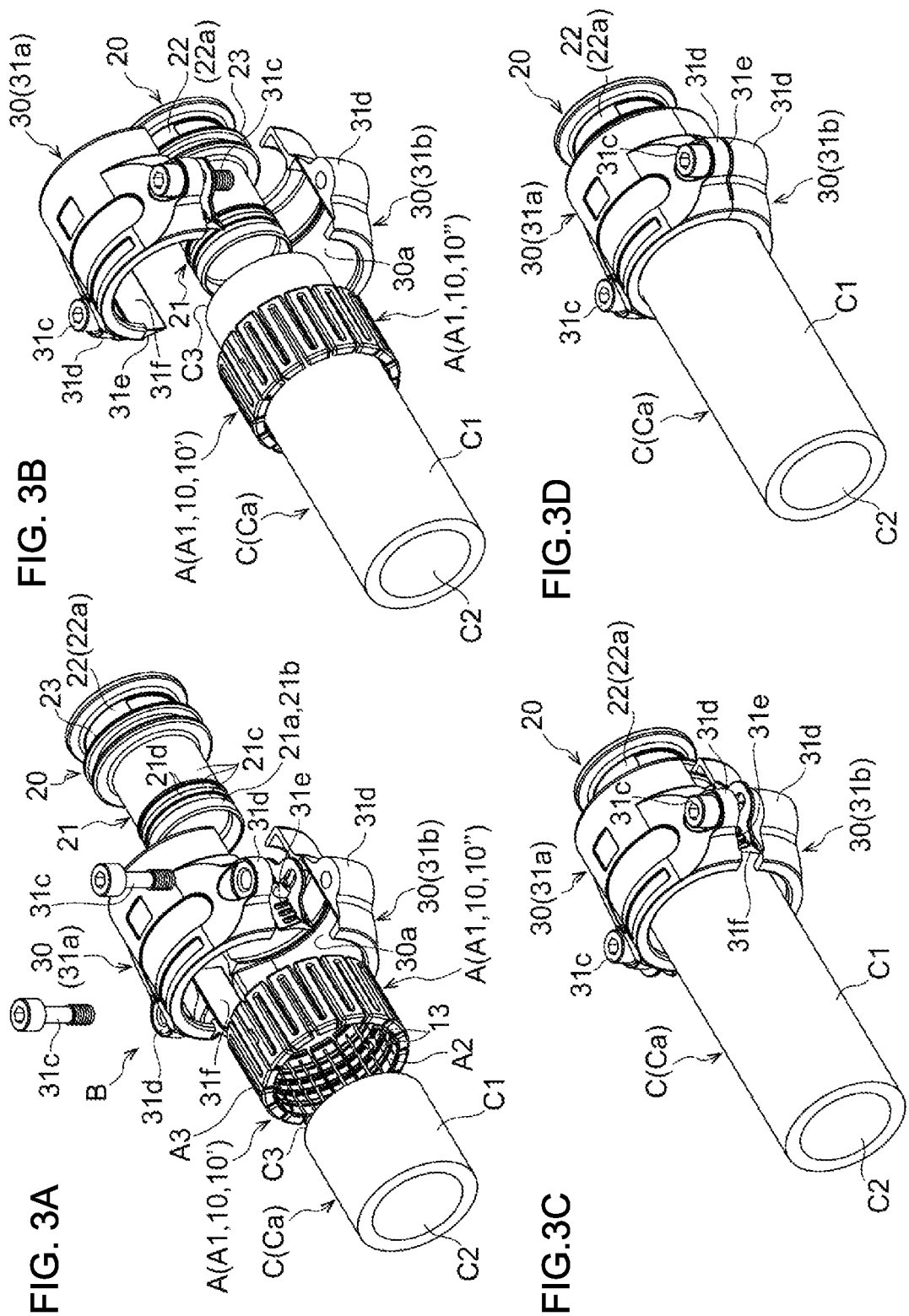
FIGS. 3A to 3D are reduced perspective views illustrating a connecting method for a hose joint and a flexible hose.

Accordingly, in a tightened state of the sleeve main body A1 illustrated in FIG. 1B and FIG. 3D, the recessed part 13 of the sleeve main body A1 comes into press contact with the outer surface C1 of the flexible hose C, and therefore the opening edge 13a of the recessed part 13 bites into the outer surface C1 of the flexible hose C.

In addition to this, in the case of the illustrated example, the tightening member 30 includes a stopper part 31e provided to face the sleeve outer surface A3 of the sleeve main body A1 in the radial direction over peripheral end parts 31d of the plurality of divided holders 31a and 31b. The stopper part 31e includes a guide surface 31f that is in contact with, in the radial direction, an excess material portion (not illustrated) of the sleeve main body A1 radially contracted and deformed according to the approach movement of the plurality of divided holders 31a and 31b by the fastening component 31c. Consequently, according to the radial contraction and deformation of the sleeve main body A1 by the approach movement of the plurality of divided holders 31a and 31b, even if the excess material portion of the sleeve outer surface A3 of the sleeve main body A1 is about to swell to between the peripheral end parts 31d of the plurality of divided holders 31a and 31b adjacent to each other in the circumferential direction, the guide surface 31f of the stopper part 31e comes into contact in the radial direction from the outer side of the excess material portion of the sleeve outer surface A3 to suppress the swelling of the excess material portion of the sleeve outer surface A3.

Accordingly, the excess material portion of the sleeve outer surface A3 does not enter between the peripheral end parts 31d of the plurality of divided holders 31a and 31b and is guided in the circumferential direction. This makes it possible to prevent biting and close (completely close) the plurality of divided holders 31a and 31b with the fastening component 31c.

As a modification of the first embodiment, although not illustrated in the figures, it is also possible to divide a cylinder body into three, four, or more as the plurality of divided holders 31a and 31b and move the respective plurality of divided holders 31a and 31b to approach in a plurality of radial directions with the fastening component 31c.

The tightening member 30 of the hose joint B according to the second embodiment of the present invention is different from the tightening member 30 according to the first embodiment in that the sleeve main body A1 is radially contracted and deformed by the compression means of the caulking type as illustrated in FIGS. 4A and 4B and FIGS. 5A to 5D. Otherwise the tightening member 30 according to the second embodiment is the same as the tightening member 30 according to the first embodiment.

In the compression means of the caulking type, the caulking pipe 32 is compressed and deformed in the radial direction by a caulking machine (not illustrated), whereby the sleeve main body A1 is pressed in the radial direction and radially contracted and deformed.

The caulking pipe 32 is a cylinder body made of a deformable plastic material such as aluminum or stainless steel that is compressed and deformed in pressurization in the radial direction by the caulking machine but is not restored and deformed by a repulsive force from the flexible hose C and the sleeve main body A1.

Specific examples of the caulking machine include a caulking machine of a driving type that moves a plurality of dices to approach the caulking pipe 32 with a driving source such as a hydraulic device and a caulking machine of a manual type.

Accordingly, in a tightened state of the sleeve main body A1 illustrated in FIG. 4B and FIG. 5D, the recessed part 13 of the sleeve main body A1 comes into press contact with the outer surface C1 of the flexible hose C, and therefore the opening edge 13a of the recessed part 13 bites into the outer surface C1 of the flexible hose C.

In the illustrated example, the axial direction length of the caulking pipe 32 is formed to be longer than the axial direction length of the sleeve main body A1. However, it is also possible to form the axial direction length of the caulking pipe 32 substantially the same as the axial direction length of the sleeve main body A1 or shorter than the axial direction length of the sleeve main body A1.

Further, as a configuration of the caulking of the caulking pipe 32 by the caulking machine, besides the caulking for uniformly tightening the entire periphery as in the illustrated example, "eight direction tightening" for caulking in a substantially regular octagonal shape in section and "straw bag tightening" for caulking a plurality of parts in the axial direction like tightening a cylindrical straw bag can be used.

The tightening member 30 of the hose joint B according to the third embodiment of the present invention is different from the tightening member 30 according to the first and second embodiments in that the sleeve main body A1 is radially contracted and deformed by the compression means of the axial direction force conversion type as illustrated in FIGS. 6A and 6B, FIGS. 7A and 7B, and FIGS. 8A to 8D. Otherwise the tightening member 30 according to the third embodiment is the same as the tightening member 30 according to the first and second embodiments.

In the compression means of the axial direction force conversion type, an axial direction movement of a slide cylinder body 33b with respect to a cylindrical part 33a of the joint main body 20 is converted into a pressurizing force in the radial direction, whereby the sleeve main body A1 is pressed in the radial direction and radially contracted and deformed.

Specifically, the compression means of the axial direction force conversion type includes a cylindrical part 33a integrally provided on the outer side of the nipple 21 with respect to the joint main body 20 and a slide cylinder body 33b supported to be capable of reciprocating in the axial direction of the nipple 21 with respect to the cylindrical part 33a.

The sleeve main body A1 used in the third embodiment includes a first taper surface A3' provided in an axial direction one half part on the sleeve outer surface A3 and a second taper surface A3" provided in an axial direction other half part. The first taper surface A3' and the second taper surface A3" are formed as inclined surfaces that gradually decrease in diameter toward the axial direction both ends of the sleeve main body A1 and becomes surface symmetrical in the axial direction.

The cylindrical part 33a of the joint main body 20 includes a first inclined surface 33c that is provided to face, in the radial direction, the outer peripheral surface 21a of the nipple 21 across the flexible hose C and the sleeve main body A1 and is in surface contact with the first taper surface A3' of the sleeve main body A1 to be slidable in the axial direction.

The slide cylinder body 33b of the tightening member 30 includes a second inclined surface 33d that is provided to face, in the radial direction, the outer peripheral surface 21a of the nipple 21 across the flexible hose C and the sleeve main body A1 and is in surface contact with the second taper surface A3" of the sleeve main body A1 to be slidable in the axial direction.

In the case of the illustrated example, the cylindrical part 33a of the joint main body 20 includes a screw (an outer screw) 33e on the outer peripheral surface. The slide cylinder body 33b of the tightening member 30 is a nut that screws with the screw (the outer screw) 33e of the cylindrical part 33a and includes a screw (an inner screw) 33f on the inner peripheral surface thereof. The second inclined surface 33d is moved to approach the first inclined surface 33c of the cylindrical part 33a with rotational operation of the slide cylinder body 33b, whereby the first taper surface A3' and the second taper surface A3" of the sleeve main body A1 are respectively radially contracted and deformed. An elastic deformable annular seal member A7 such as an O-shaped ring is fit in a recessed part 13 in the axial direction center on the sleeve inner surface A2 of the sleeve main body A1 to be held immovable in the axial direction.

Accordingly, in a tightened state of the sleeve main body A1 illustrated in FIG. 6B and FIG. 8D, the recessed part 13 of the sleeve main body A1 and the inner end face of the seal member A7 come into press contact with the outer surface C1 of the flexile hose C. The opening edge 13a of the recessed part 13 bites into the outer surface C1 of the flexible hose C and, at the same time, the inner end face of the seal member A7 adheres to the outer surface C1 of the flexible hose C.

As a modification of the third embodiment, although not illustrated in the figures, instead of the screwing of the slide cylinder body 33b and the cylindrical part 33a, a structure other than the screw can be used if the slide cylinder body 33b can be moved in the axial direction with respect to the cylindrical part 33a.

With the hose joint sleeve A according to the embodiment of the present invention explained above, as illustrated in FIGS. 2A and 2B, the parts to be fitted 12 of the other belt-like body 10 (the second belt-like body 10") are engaged with the fitting parts 11 of any one belt-like body 10 (the first belt-like body 10') of the plurality of belt-like bodies 10, whereby the plurality of belt-like bodies 10 are cylindrically coupled to form the sleeve main body A1 deformable in the circumferential direction. As shown in FIG. 2B, the fitting part 11 and the part to be fitted 12 are formed in shapes such that the fitting part 11 and the part to be fitted 12 engage with each other through a relative sliding movement in an axial direction of the sleeve main body A1 to couple the plurality of belt-like bodies 10.

In the coupling of the plurality of belt-like bodies 10 by the fitting parts 11 and the parts to be fitted 12, the respective recessed parts 13 are annularly connected.

In the coupled state of the plurality of belt-like bodies 10, the sleeve main body A1 is radially contracted and deformed as a whole, whereby the annular recessed part 13 comes into press contact with the outer surface C1 of the flexible hose C and presses the flexible hose C toward the outer peripheral surface 21a of the nipple 21. As shown in FIG. 2A, the fitting part 11 and the part to be fitted 12 are operable to translate circumferentially-directed tensile forces between adjacent belt-like bodies, such that the sleeve main body is radially expandable and contractable as a whole. Accordingly, the opening edge 13a of the recessed part 13 bites into the outer surface C1 of the flexible hose C.

Accordingly, the flexible hose C is tightened and prevented from slipping off from the nipple 21 by the sleeve main body A1 including the radially contracted and deformed plurality of belt-like bodies 10.

Therefore, the flexible hose C can be fastened to be unable to slip off from the nipple 21 by the coupling of the plurality of belt-like bodies 10 divided in the same shape.

As a result, compared with the conventional structure in which the uneven part formed on the inner wall surface of the tightening ring is the undercut, it is possible to provide the sleeve main body A1 including the resin molded product that is capable of surely preventing even the flexible hose C made of a soft material such as silicone rubber from slipping off from the nipple 21 and has simple structure, by the sleeve main body A1 including the resin molded product having simple structure.

Consequently, the sleeve main body A1 having the complicated shape can be molded in a large quantity, and improvement of productivity and a reduction of cost can be achieved.

In particular, it is preferable that the plurality of belt-like bodies 10 are formed in a symmetrical shape in the axial direction of the sleeve main body A1, and the fitting part 11 and the part to be fitted 12 are formed to engage with each other by changing the orientation of one (the first belt-like body 10') of the plurality of belt-like bodies 10 with respect to another (the second belt-like body 10").

In this case, as indicated by the arrows in FIG. 2B, the orientation of the other (the second belt-like body 10") is changed by reversing the other belt-like body 10 with respect to the one (the first belt-like body 10') formed symmetrically and in the same shape in the axial direction of the sleeve main body A1, whereby disposition of the fitting part 11 and the part to be fitted 12 in the one belt-like body 10 (the first belt-like body 10') and disposition of the fitting part 11 and the part to be fitted 12 in the other belt-like body 10 (the second belt-like body 10") are in opposite orientations.

Accordingly, the fitting part 11 and the part to be fitted 12 in the one belt-like body 10 (the first belt-like body 10') and the fitting part 11 and the part to be fitted 12 in the other belt-like body 10 (the second belt-like body 10") are respectively capable of engaging.

Therefore, the belt-like bodies 10 having the same shape can be coupled and integrated by simple operation.

As a result, the sleeve main body A1 can be easily formed by only the belt-like bodies 10 having the same shape.

Consequently, component management is facilitated and a great reduction in cost can be achieved.

By changing the number of coupled belt-like bodies 10, it is also possible to create a plurality of sleeve main bodies A1 having different radial sizes.

Further, it is preferable to mold the plurality of belt-like bodies 10 from a material harder than the constituent material of the flexible hose C.

In this case, even if the constituent material of the flexible hose C is a soft material like silicone rubber, the flexible hose C is pressed toward the outer peripheral surface 21a of the nipple 21 and tightened not to able to slip off by the radial contraction and deformation of the sleeve main body A1 formed by coupling of the plurality of belt-like bodies 10 harder than the flexible hose C.

Therefore, the flexile hose C made of the soft material can be surely fastened to the nipple 21.

As a result, a slip-off preventing function of the flexible hose C made of the soft material is reinforced. Stable pipe connection of the flexible hose C is maintained over a long period. Occurrence of an accident such as a fluid leak can be prevented. Safety and economy are excellent.

Note that, in the embodiments explained above, in the illustrated example, the sleeve main body A1 is divided into two in the circumferential direction and two belt-like bodies 10 having the same shape are injection-molded. However, not only this, but, according to the radial size of the nipple 21 and the flexible hose C, the sleeve main body A1 may be divided into three or more in the circumferential direction, three or more belt-like bodies 10 having the same shape may be injection-molded, and the three or more belt-like bodies 10 may be coupled by the fitting parts 11 and the parts to be fitted 12.

Further, in the first to third embodiments, as the tightening member 30, the compression means of the divided type, the compression means of the caulking type, and the compression means of the rotation tightening type are used. However, not only this, but compression means of structures other than the above may be used.

REFERENCE SIGNS LIST

A Hose joint sleeve
A1 Sleeve main body
A2 Inner surface (sleeve inner surface) of belt-like body
10 Belt-like body
11 Fitting part
12 Part to be fitted
13 Recessed part
B Hose joint 21 Nipple
21a Outer peripheral surface
C Flexible hose
C1 Outer surface

The invention claimed is:

1. A hose joint sleeve comprising a sleeve main body that is made of resin or rubber and elastically deformable in a radial direction and is provided to hold a flexible hose between the sleeve main body and a nipple of a hose joint, the hose joint sleeve being configured to press and tighten the flexible hose toward an outer peripheral surface of the nipple with radial contraction and deformation of the sleeve main body, wherein the sleeve main body includes a plurality of belt-like (band-shaped) bodies divided at equal intervals in a circumferential direction of the sleeve main body, each of the belt-like bodies being formed to be deformable in the circumferential direction, and each of the belt-like body is configured as a single unitary element, the plurality of belt-like bodies includes a plurality of belt plate parts and a plurality of slits, the plurality of slits linearly extending toward both sides of the plurality of belt-like bodies in opposite axial directions and dividing the belt-like body into the plurality of belt plate parts, and the plurality of slits are disposed at predetermined intervals in the circumferential direction of the sleeve main body to relatively extend in the axial direction, each of the plurality of belt-like bodies includes a fitting part provided at one end in a circumferential direction of each of the plurality of belt-like bodies, a part to be fitted provided at the other end of each of the plurality of belt-like bodies, and a recessed part provided on an inner surface facing an outer surface of the flexible hose in a radial direction, the fitting part and the part to be fitted are formed in shapes such that the fitting part and the part to be fitted engage with each other through a relative sliding movement in an axial direction to couple the plurality of belt-like bodies, wherein the fitting part and the part to be fitted are operable to translate circumferentially-directed tensile forces between adjacent belt-like bodies, such that the sleeve main body is radially expandable and contractable as a whole, and a plurality of the recessed parts are formed to be annularly connected to each other concomitantly with the coupling of the plurality of belt-like bodies.

2. The hose joint sleeve according to claim 1, wherein the plurality of belt-like bodies are formed in a symmetrical shape in an axial direction of the sleeve main body, and the fitting part and the part to be fitted are formed to engage with each other by changing an orientation of one belt-like body of the plurality of belt-like bodies with respect to the other belt-like body of the plurality of belt-like bodies.

3. A hose joint comprising the hose joint sleeve according to claim 1.

4. A hose joint comprising the hose joint sleeve according to claim 2.

\* \* \* \* \*